US009993888B2

(12) United States Patent
Kasai et al.

(10) Patent No.: US 9,993,888 B2
(45) Date of Patent: Jun. 12, 2018

(54) WIRE ELECTRICAL DISCHARGE MACHINE

(71) Applicant: FANUC Corporation, Yamanashi (JP)

(72) Inventors: Hirotsugu Kasai, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 296 days.

(21) Appl. No.: 15/058,157

(22) Filed: Mar. 2, 2016

(65) Prior Publication Data

US 2016/0263689 A1 Sep. 15, 2016

(30) Foreign Application Priority Data

Mar. 12, 2015 (JP) .................................. 2015-49087

(51) Int. Cl.
*B23H 5/00* (2006.01)
*B23H 1/02* (2006.01)
*B23H 11/00* (2006.01)
*B23H 7/02* (2006.01)

(52) U.S. Cl.
CPC ............... *B23H 1/02* (2013.01); *B23H 11/00* (2013.01); *B23H 7/02* (2013.01)

(58) Field of Classification Search
CPC ............. B23H 1/02; B23H 11/00; B23H 7/02
USPC ...... 219/68, 69.2, 69.11, 69.12, 69.17, 69.14, 219/69.15, 70, 71
See application file for complete search history.

(56) References Cited

U.S. PATENT DOCUMENTS 5,306,889 A * 4/1994 Kaneko ................... B23H 7/04
219/69.12
2013/0092661 A1 * 4/2013 Yoshida ................... B23H 7/04
219/69.16

FOREIGN PATENT DOCUMENTS

| JP | 60-180726 A | 9/1985 |
| JP | 01-163028 U | 11/1989 |
| JP | 3-294118 A | 12/1991 |
| JP | 5-329713 A | 12/1993 |
| JP | 8-1439 A | 1/1996 |
| JP | 2504638 Y2 | 7/1996 |
| JP | 2001-129725 A | 5/2001 |

OTHER PUBLICATIONS

Extended European Search Report in Ep Application No. 16159511.1, dated Jul. 28, 2016.
Office Action in JP Application No. 2015-049087, dated Apr. 4, 2017.

* cited by examiner

*Primary Examiner* — Phuong Nguyen
(74) *Attorney, Agent, or Firm* — Hauptman Ham, LLP

(57) ABSTRACT

A wire electrical discharge machine recognizes that the finished piece (core) has been separated from the piece of work as a result of electrical discharge machining, allows fluid to be jetted against the finished piece (core) from the lower nozzle so that the finished piece (core) floats upward, recognizes that the finished piece (core) has floated upward by a predetermined amount on the basis of the completion of the process program or the information gained from the sensor, and allows the core removal unit to catch the finished piece (core) for removal and collection after it has been recognized that the finished piece (core) has floated upward by the predetermined amount.

10 Claims, 3 Drawing Sheets

WIRE ELECTRICAL DISCHARGE MACHINE

RELATED APPLICATIONS

The present application claims priority to Japanese Patent Application Number 2015-49087 filed Mar. 12, 2015, the disclosure of which is hereby incorporated by reference herein in its entirety.

BACKGROUND OF THE INVENTION

1. Field of the Invention

The present invention relates to a wire electrical discharge machine, and in particular, to a wire electrical discharge machine where it is possible to collect the finished piece (core) by using a manipulator such as a robot.

2. Description of the Related Art

A wire electrical discharge machine processes a workpiece by using a portion of a wire electrode that runs in the vertical direction (up to down direction) between upper and lower wire guide units. The wire electrode is guided through a number of rollers that are fixed to the main body of the wire electrical discharge machine so as to be supplied to the wire guide units equipped with the wire electrical discharge machine. The wire guide units have a wire guide that guides the wire electrode.

Meanwhile, the worktable on which a piece of work is placed moves in the X direction and in the Y direction in accordance with the situation of how the piece of work is to be processed following the instructions from the control unit. The movement in the X direction and the movement in the Y direction are synthesized so that electrical discharge machining processes between the workpiece and the wire electrode that has been supplied between the wire guide units. The workpiece is processed to a predetermined form through electrical discharge machining as the wire electrode and the table move relative to each other.

The wire electrical discharge machine has such a problem that the quality of the finished piece (core) lowers in the case where the finished piece (core) gained by processing the piece of work is left immersed in a process liquid such as water stored in the processing tank. When cemented carbide is left immersed in the process liquid, for example, cobalt comes out from the piece of work, which then becomes friable. When a material such as NAK steel that easily rusts is left immersed, the quality of the finished piece lowers due to the generated rust after machining.

Furthermore, the finished piece left in the processing tank may cause damage to the machine when the finished piece is caught within the wire electrical discharge machine, for example, the finished piece enters into a narrow gap within the processing tank in the wire electrical discharge machine; the finished piece may get caught on the pleated flexible tube, which then breaks; or the finished piece may get caught on a cable, which then disconnects. Moreover, it is difficult to recognize the shape of the finished piece when the finished piece falls within the processing tank, and then it becomes difficult to sort out the finished piece.

In order to solve the problems, Utility Model Registration No. 2504638 discloses a wire electrical discharge machine having such functions that the finished piece is pushed upward until it makes contact with the upper nozzle by means of the strong force of the jetted process liquid and the pressure of the process liquid, and the finished piece is held by a robot arm and then placed in a finished piece container. Utility Model Registration No. 2504638 is characterized by the provision of a sealing member for sealing the gap between the workpiece and the lower nozzle. In addition, Japanese Unexamined Patent Publication S60 (1985)-180726 discloses a wire electrical discharge machine having such functions that a cut out member (finished piece) is suctioned by the instructions from the control unit, and the suctioned finished piece is moved to a container for disposal.

The technology disclosed in Utility Model Registration No. 2504638 is not equipped with a method for recognizing that the finished piece (core) is floating. Therefore, the time when the finished piece (core) floats to a predetermined height cannot be specified, which makes it difficult to determine the point in time when the robot arm is to start operating. In other cases, the hand of the robot arm may fail to catch the finished piece that is not floating sufficiently, or the finished piece (core) may drift away from the hand of the robot arm in the middle of the process of catching the finished piece (core) that is not floating sufficiently with the hand of the robot arm and placing it in a container. When the finished piece has drifted away within the processing tank, it is difficult to collect the finished piece automatically, and therefore, the automated operation of the wire electrical discharge machine must be stopped.

In the technology disclosed in Japanese Unexamined Patent Publication S60 (1985)-180726, it is possible for the cut out member (finished piece) to drift away in the middle of the process of suctioning the cut out member (finished piece) and moving it to the container. In this case as well, it is difficult to automatically collect the cut out member (finished piece) that has drifted away, and therefore, the automated operation of the wire electrical discharge machine must be stopped.

SUMMARY OF THE INVENTION

In view of the problems with the prior art, an object of the present invention is to provide a wire electrical discharge machine where it is possible to automatically collect the finished piece (core) without fail.

The wire electrical discharge machine according to the present invention is a wire electrical discharge machine where a wire electrode is held between an upper wire guide unit above and a lower wire guide unit beneath a piece of work, and the wire electrode and the piece of work are made to move relative to each other in accordance with a process program so that the piece of work is processed by the wire electrode through electrical discharge machining so as to cut out a core, which is characterized by having: a fluid jetting unit for jetting a fluid against the piece of work; a fluid supplying unit for supplying fluid to the fluid jetting unit; a core separation recognition unit for recognizing that the core has been separated from the piece of work as a result of electrical discharge machining; an upward movement execution unit for moving the upper wire guide unit to a predetermined location after the core separation recognition unit has recognized the separation of the core; a core floating execution unit for floating the core by jetting fluid from the fluid jetting unit through the control of the fluid supplying unit; a core floating recognition unit for recognizing that the core has floated by a predetermined amount; and a core removal unit for catching the core for removal and collection after the core floating recognition unit has recognized that the core has floated by the predetermined amount. The present invention can provide a wire electrical discharge machine with which the finished piece (core) can be automatically collected without fail.

In addition, the fluid supplying unit may include a process liquid pump, and the liquid may be a process liquid that is supplied from the process liquid pump and is used for electrical discharge machining.

Furthermore, the fluid supplying unit may include a compressor, and the fluid may be compressed air supplied from the compressor.

Moreover, the core separation recognition unit may recognize that the core has been separated from the piece of work through the analysis of the program.

The core separation recognition unit may recognize that the core has been separated from the piece of work through the detection of a predetermined physical quantity that fluctuates in relation with the position of the core relative to the piece of work.

The core separation recognition unit may recognize that the core has been separated from the piece of work through the analysis of the program and may recognize that the core has been separated from the piece of work through the detection of a predetermined physical quantity that fluctuates in relation with the position of the core relative to the piece of work.

The core floating recognition unit may recognize that the core has floated by the predetermined amount through the detection of a predetermined physical quantity that fluctuates in relation with the position relative to the core.

The predetermined physical quantity can be detected through the usage of a pressure gauge, a contact sensor or a distance sensor.

A robot may be used for the core removal unit.

A core sorting unit may be provided for sorting the core after the core has been collected by the core removal unit.

The core sorting unit may be formed of a robot and an image recognition unit.

BRIEF DESCRIPTION OF THE DRAWINGS

The above-described and other objects and features of the present invention will be clarified from the description of the following embodiment in reference to the attached drawings, from among which.

DETAILED DESCRIPTION OF THE PREFERRED EMBODIMENTS

In the following, an embodiment of the present invention is described in reference to the drawings.

Figure 1:
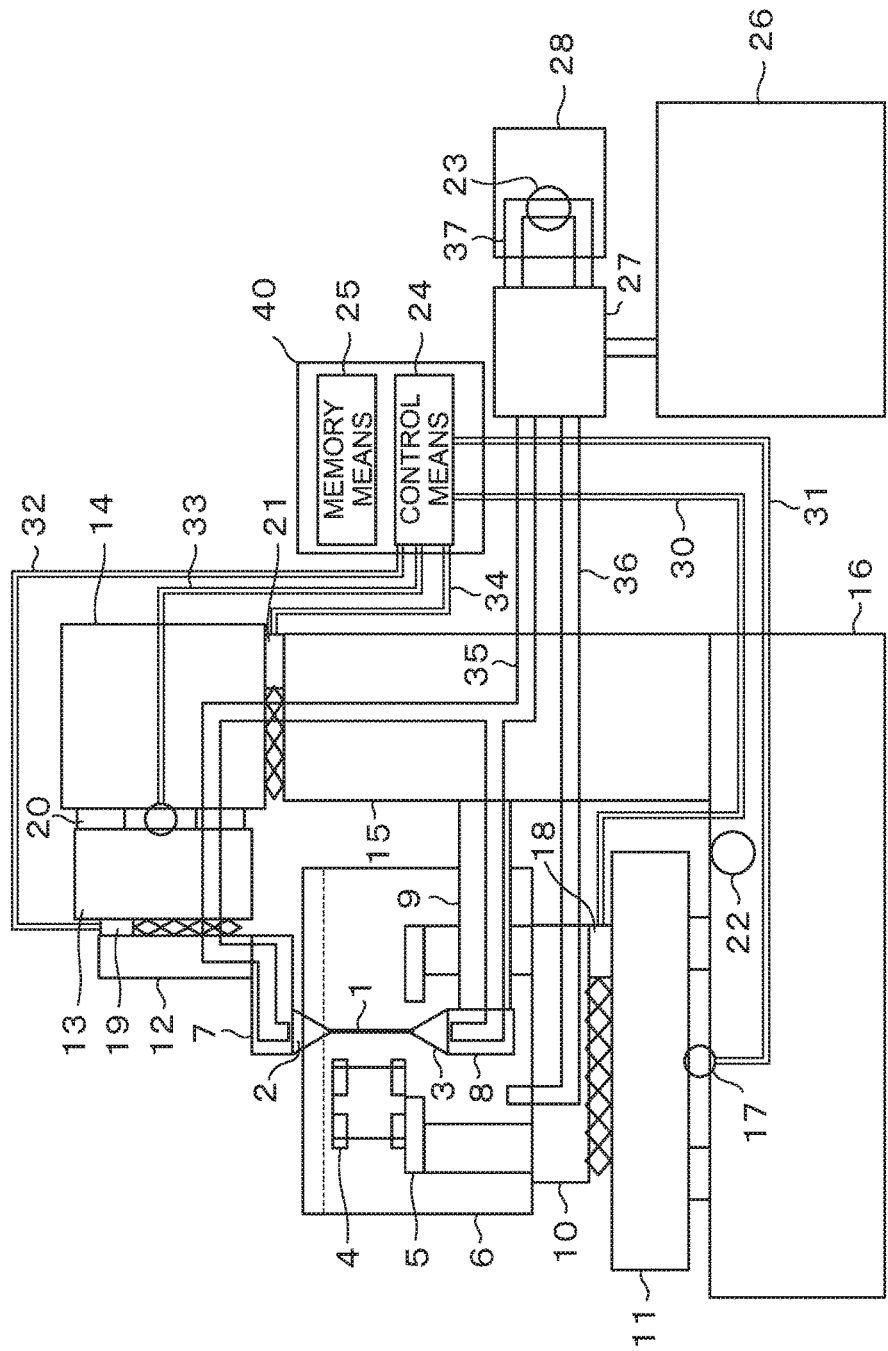
FIG. 1 is a diagram showing the configuration of a wire electrical discharge machine.

FIG. 1 is a diagram showing the configuration of a wire electrical discharge machine having a function of collecting a finished piece (hereinafter referred to as core). A process fluid is discharged from a processing tank 6 to a wastewater tank 26 through a pipe, not shown. The process liquid that has been discharged from the processing tank 6 to the wastewater tank 26 includes debris created through electrical discharge machining, and therefore is moved to a clean water tank 27 through a filter, not shown. The clean water tank 27 is installed with a process liquid temperature adjusting unit 28. The process liquid in the clean water tank 27 circulates through the process liquid temperature adjusting unit 28 via a pipeline 37 so that the process liquid temperature adjusting unit 28 adjusts the temperature of the process liquid. Then, the process liquid in the clear water tank 27 is fed back into the processing tank 6 through the pipelines 35 and 36. Here, pumps such as the one for feeding the process liquid from the clear water tank 27 to the processing tank 6 are not shown.

The relative positional relationship between a wire electrode 1 and a piece of work 4 changes when the respective axis motors are driven by a control means 24 in a control unit 40. An X axis drive motor 17 that is controlled by the control means 24 through an X axis drive motor signal line 31 drives an X axis saddle 11. A Y axis drive motor 18 that is controlled by the control means 24 through a Y axis drive motor signal line 30 drives a Y axis saddle 10 so as to position the wire electrode 1 and the piece of work 4 relative to each other in the XY directions.

A U axis drive motor 20 that is controlled by the control means 24 through a U axis drive motor signal line 33 drives a U axis saddle 13, and a V axis drive motor 21 that is controlled by the control means 24 through a V axis drive motor signal line 34 moves a V axis saddle 14 so as to shift the location of an upper head unit 7 in the UV directions, and thus positions the inclination of the wire electrode 1.

A Z axis drive motor 19 that is controlled by the control means 24 through a Z axis drive motor signal line 32 determines the location of the height of the upper head unit 7 that is attached to the Z axis saddle 12. The wire electrode 1 is positioned as the position thereof is being detected by position detectors built in the drive motors 17, 18, 19, 20 and 21 for the respective axes.

Figure 2:
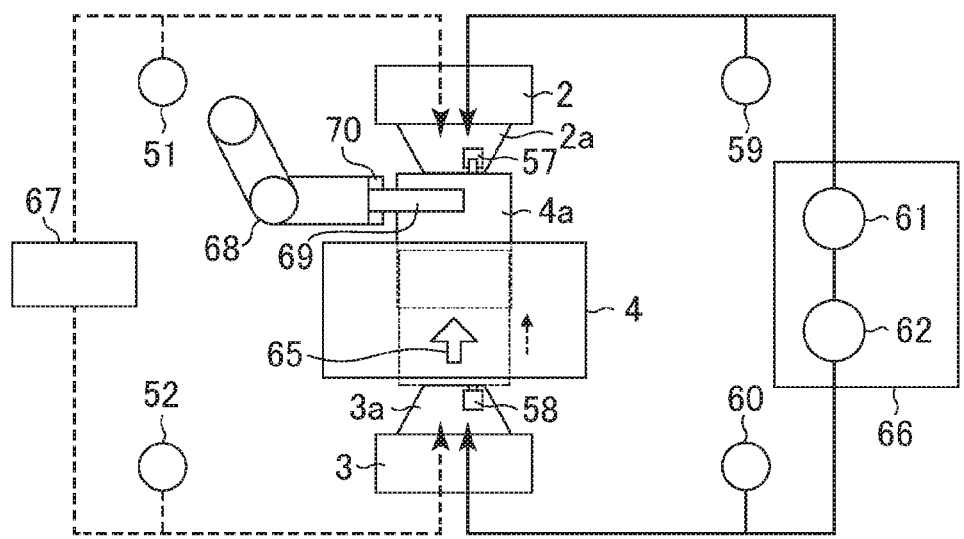
FIG. 2 is a block diagram showing the main portion of the wire electrical discharge machine according to the present invention.

An upper guide 2 in the upper head unit 7 is provided with an upper nozzle 2a for jetting a process liquid (see FIG. 2). A lower guide 3 in the lower head unit 8 is provided with a lower nozzle 3a for jetting a process liquid (see FIG. 2). The control unit 40 in the wire electrical discharge machine applies a voltage between the piece of work 4 and the wire electrode 1 that is stretched between the upper guide 2 attached to the upper head unit 7 and the lower guide 3 attached to the lower head unit 8 and carries out electrical discharge machining while moving the piece of work 4 and the wire electrode 1 relative to each other.

The configuration of the wire electrical discharge machine is the same as that which is publicly known. The present invention is further provided with the configuration that is described below in reference to FIGS. 2 and 3.

FIG. 2 is a block diagram showing the main portion of the wire electrical discharge machine according to the present invention.

According to the embodiment of the present invention, a core separation recognition unit can be formed in the wire electrical discharge machine using a sensor for acquiring a physical quantity. A non-contact sensor for measuring the distance as the physical quantity or a contact sensor for sensing contact can be used.

The provision of the contact separation recognition unit makes it possible to recognize that the finished piece 4a, or the core, has been separated from the piece of work 4. The core separation recognition unit is formed of a lower contact sensor 58 that is attached to the lower guide 3 and recognizes the separation of the finished piece (core) 4a when the finished piece (core) 4a that has been cut out from the piece of work 4 makes contact with the lower contact sensor 58. The output signal from the lower contact sensor 58 is inputted into the control unit 40.

The lower contact sensor 58 may be attached to the lower nozzle 3a instead of being attached to the lower guide 3 or may be attached to both the lower guide 3 and the lower nozzle 3a. When a lower contact sensor 58 is attached to both the lower guide 3 and the lower nozzle 3*a*, the reliability of the core separation recognition can be further increased.

In place of finding a physical quantity, the core separation recognition unit may recognize the separation of the core at the point in time when the core cut out program in the process program is completed. Typically, a FIN code is written into the process program so that a signal goes off at the point in time when the code is passed. At the point in time when the control unit 40 receives the FIN signal, the completion of the core cut out program is recognized.

The recognitions of the separation of the finished piece (core) 4*a* by the lower contact sensor 58 that measures a physical quantity and by the process program may be combined for the confirmation. When the separation recognition means using the lower contact sensor 58 and the separation recognition means using the process program are combined, the reliability of the recognition of the separation of the finished piece (core) 4*a* from the piece of work 4 can be further increased.

The provision of an upper guide movement execution unit (typically, the control of driving the Z axis drive motor 19) makes it possible to move the upper guide 2 to a predetermined location. When the core floating execution unit (control for floating the finished piece (core) 4*a*) makes the finished piece (core) 4*a* float, the finished piece (core) 4*a* can be prevented from popping out. The location of the upper guide 2 is determined by the thickness of the piece of work 4 and the distance between the upper surface of the piece of work 4 and the lower surface of the upper nozzle 2*a*, and thus set so that the distance between the upper surface of the piece of work 4 and the lower surface of the upper nozzle 2*a* is smaller than the thickness of the piece of work 4.

When the upper guide 2 or the upper nozzle 2*a* is raised too much relative to the upper surface of the piece of work 4, for example, when the workpiece is processed in the state where the upper nozzle 2*a* is separated from the piece of work 4, the Z axis drive motor 19 is driven so as to lower the position of the upper guide 2 or the upper nozzle 2*a*.

When the workpiece is processed in close proximity, the locations of the upper guide and the upper nozzle 2*a* are raised to make the collection of the finished piece (core) 4*a* easy. This setting makes it possible to prevent the finished piece (core) 4*a* from popping out of the piece of work 4. The prevention of popping out of the finished piece (core) 4*a* from the piece of work 4 makes it possible to prevent the finished piece (core) 4*a* from being lost or to prevent the finished piece (core) 4*a* from damaging the main body of the wire electrical discharge machine.

The provision of a core floating execution unit makes it possible to jet fluid from the lower guide 3 so that the finished piece (core) 4*a* can float up to the location designated by the upper guide movement execution unit. As the fluid, a process liquid that is jetted from the lower process liquid pump 62 to the lower guide 3 or the lower nozzle 3*a*, or compressed air that is jetted from the compressor (air compressor 67) to the lower guide 3 or the lower nozzle 3*a* is used.

The provision of a core floating recognition unit makes it possible to recognize that the finished piece (core) 4*a* has floated. The core floating recognition unit uses a sensor for measuring a physical quantity in order to recognize that the finished piece (core) 4*a* has floated. For example, an upper contact sensor 57 is provided in the vicinity of the upper guide 2 or the upper nozzle 2*a* so that the floating of the finished piece (core) 4*a* is recognized when the finished piece (core) 4*a* makes contact with the upper contact sensor 57. The floating of the finished piece (core) 4*a* may be recognized when the finished piece (core) 4*a* is separated from the lower contact sensor 58 that is provided in the vicinity of the lower guide 3 or the lower nozzle 3*a*.

The floating of the finished piece (core) 4*a* may be recognized when the pressure lowers in a lower pressure gauge (for process liquid) 60 that is provided between the lower process liquid pump 62 and the lower guide 3, or in a lower pressure gauge (for air) 52 that is provided between the compressor (air compressor 67) and the lower guide 3.

The floating of the finished piece (core) 4*a* may be recognized when fluid is jetted from the upper guide 2 in advance and the pressure increases in an upper pressure gauge (for process liquid) 59 that is provided between the upper process liquid pump 61 and the upper guide 2, or in an upper pressure gauge (for air) 51 that is provided between the compressor (air compressor 67) and the upper guide 2. At this time, the fluid jetted from the upper guide 2 is weaker than the fluid jetted from the lower guide 3. The pressure gauges 51, 52, 59 and 60 provided between the pumps (upper process liquid pump 61 and lower process liquid pump 62) and the guides (upper guide 2 and lower guide 3) may be directly attached to the upper guide 2, the lower guide 3, the upper nozzle 2*a* or the lower nozzle 3*a* so that the pressure is measured. The reliability of the recognition of the floating of the finished piece (core) 4*a* can be further increased by combining two or more of the methods.

The provision of a core floating recognition unit makes it possible to specify the time when the finished piece (core) 4*a* floats up to a predetermined height, which makes it easy to determine the point in time when the robot arm is to start operating. In addition, the confirmation of the fact that the finished piece (core) 4*a* has floated up to a predetermined height makes it possible for the hand 69 of the manipulator 68 to catch the finished piece (core) 4*a* without fail. That is to say, the hand 69 of the manipulator 68 will not try to catch the finished piece (core) 4*a* that has not floated sufficiently, and thus, the finished piece (core) 4*a* can be prevented from drifting away from the hand 69 of the manipulator 68 in the middle of the process of collecting the finished piece (core) 4*a* in a container. When a finished piece drifts away within the processing tank, it is difficult to automatically collect the finished piece, and therefore, the automated operation of the wire electrical discharge machine must be stopped.

A non-contact sensor such as a velocity sensor 70 or a proximity sensor may be attached to the core removal unit (manipulator 68 of a robot) in order to recognize the floating of the finished piece (core) 4*a*. The provision of a core removal unit formed of the manipulator 68 of a robot makes it possible to automatically remove the finished piece (core) 4*a* that has floated. The hand 69 attached to the manipulator 68 is moved to a location that makes it possible to grasp the finished piece (core) 4*a* before floating between the lower nozzle 3*a* and the upper surface of the piece of work 4. When the core floating recognition unit recognizes the floating of the finished piece (core) 4*a*, the finished piece (core) 4*a* is grasped by the hand 69 so as to be removed. The automated removal makes it possible to reduce the number of steps that require manual operation.

The provision of a core sorting unit makes it possible to automatically sort the finished piece (core) 4*a* that has been removed from the core removal unit, and thus reduces the number of steps that require manual operation. As the core sorting unit, an image recognition unit (not shown) can be used. The image recognition unit may be attached to a robot (manipulator 68) as a provision.

The core sorting unit (image recognition unit) is used in advance to sort the core from the shape it has been processed into before the finished piece (core) 4a is floated from the piece of work 4, and the core removal unit (manipulator 68) is used to grasp the finished piece (core) 4a that has floated. After grasping the finished piece (core) 4a, the upper guide 2 is moved by a predetermined distance, and the core removal unit (manipulator 68) is used to remove the finished piece (core) 4a, which is then collected and put into a predetermined place such as in a sort tray (not shown). In accordance with the method for moving the upper guide 2, the Z axis drive motor 19 is driven so as to raise the upper guide 2, the U axis drive motor 20 and the V axis drive motor 21 are used to move the upper guide 2 in the left and right or the forward and backward directions within the plane along the U axis and the V axis, or the two are combined.

The quantity for each shape that has been counted in the wire electrical discharge machine at the time of electrical discharge machining (for example, the number of times a predetermined shape program is called out) and the quantity for each shape that has been determined by the core sorting unit and collected by the core removal unit are compared. In the case where the quantity is different, an alarm or an alert is reported so that a human makes the final confirmation.

Figure 3:
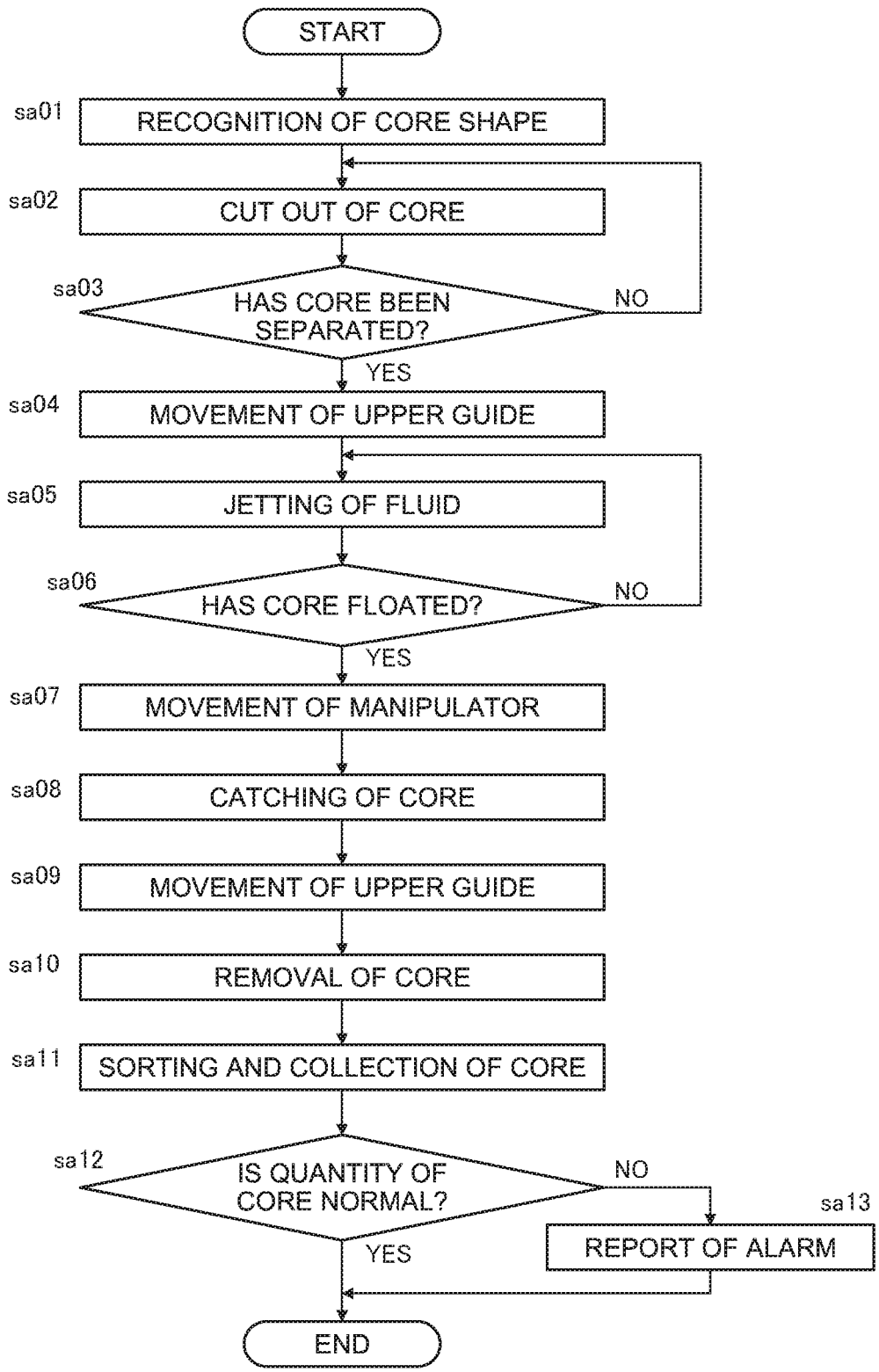
FIG. 3 is a flow chart showing the procedure of removing the finished piece according to the present invention.

FIG. 3 is a flowchart showing the procedure for removing a finished piece according to the present invention. This is described below for each step.

[Step sa01] The process program is read in so as to recognize the shape of the finished piece (core).
[Step sa02] A process for cutting out a finished piece (core) is executed.
[Step sa03] Whether or not the finished piece (core) has been separated after the completion the process for cutting out a finished piece (core) is determined, and the procedure is shifted to Step sa04 in the case where the finished piece has been separated (YES) and the procedure is returned to step sa02 in the case where the finished piece has not been separated (NO) so that the process for cutting out a finished piece (core) is continued.
[Step sa04] The upper guide is moved upward.
[Step sa05] Fluid is jetted from the lower guide unit.
[Step sa06] Whether or not the finished piece (core) has floated is determined, and the procedure is shifted to step sa07 in the case where the finished piece (core) has floated (YES) and the procedure is returned to step sa05 in the case where the finished piece (core) has not floated (NO) so that the jetting of fluid is continued.
[Step sa07] The manipulator is moved.
[Step sa08] The finished piece is grasped.
[Step sa09] The upper guide is moved upward.
[Step sa10] The finished piece (core) is removed.
[Step sa11] The finished piece (core) is sorted and collected, and the processed is complete.
[Step sa12] Whether or not the quantity of the finished pieces (cores) is normal is determined, and in the case of normal (YES), the process is complete, and in the case of not normal (NO), the procedure is shifted to step sa13.
[Step sa13] An alarm is reported and the process is complete.

In the present invention, the finished piece (core) 4a is collected without drifting away within the processing tank 6, and therefore, there are no concerns that the machine may be damaged by the finished piece (core) 4a getting caught within the processing tank 6, for example, the finished piece enters into a narrow gap within the processing tank 6 in the wire electrical discharge machine; the finished piece (core) 4a may get caught on the pleated flexible tube, which then breaks; the finished piece (core) 4a may get caught on a cable, which then disconnects; or the finished piece (core) 4a scratches the inside of the machine or the piece of work 4. The finished piece (core) 4a can be removed immediately after electrical discharge machining, and therefore, the quality of the finished piece can be prevented from deteriorating, that is, rust can be prevented from being generated and cobalt can be prevented from coming off of cemented carbide. The manipulator 68 such as a robot can be used to remove the finished piece so that collection is possible even when the finished piece is non-magnetic. The shape can be recognized before the finished piece (core) 4a drifts away and falls within the processing tank 6, and therefore, the collection is effective particularly for the finished piece having such a shape that makes it easy to fall. The automatic removal of the finished piece (core) 4a can reduce the number of steps that would require manual operation in order to remove the finished piece (core) 4a, and therefore, the productivity of the wire electrical discharge machining increases.

Though the embodiment of the present invention is described in the above, the present invention is not limited to the above-described embodiment and can be implemented with other embodiments by adding appropriate modifications.

The invention claimed is:

1. A wire electrical discharge machine, where a wire electrode is held between an upper wire guide unit above and a lower wire guide unit beneath a piece of work, and said wire electrode and said piece of work are made to move relative to each other in accordance with a process program so that said piece of work is processed by said wire electrode through electrical discharge machining so as to cut out a core, comprising:
   a fluid jetting unit for jetting a fluid against said piece of work;
   a fluid supplying unit for supplying fluid to said fluid jetting unit;
   a core separation recognition unit for recognizing that the core has been separated from said piece of work as a result of electrical discharge machining;
   an upward movement execution unit for moving said upper guide unit to a predetermined location after said core separation recognition unit has recognized the separation of the core;
   a core floating execution unit for floating said core by jetting fluid from said fluid jetting unit through the control of said fluid supplying unit;
   a core floating recognition unit for recognizing that said core has floated by a predetermined amount;
   a core removal unit for catching said core for removal and collection after said core floating recognition unit has recognized that said core has floated by said predetermined amount; and
   a core sorting unit for sorting said core after said core has been collected by said core removal unit.

2. The wire electrical discharge machine according to claim 1, wherein said fluid supplying unit includes a process liquid pump, and said liquid is a process liquid that is supplied from said process liquid pump and is used for electrical discharge machining.

3. The wire electrical discharge machine according to claim 1, wherein said fluid supplying unit includes a compressor, and said fluid is compressed air supplied from said compressor.

4. The wire electrical discharge machine according to claim 1, wherein said core separation recognition unit recognizes that said core has been separated from said piece of work through the analysis of said program.

5. The wire electrical discharge machine according to claim 1, wherein said core separation recognition unit recognizes that said core has been separated from said piece of work through the detection of a predetermined physical quantity that fluctuates in relation with the position of said core relative to said piece of work.

6. The wire electrical discharge machine according to claim 5, wherein said predetermined physical quantity is detected through the usage of a pressure gauge, a contact sensor or a distance sensor.

7. The wire electrical discharge machine according to claim 1, wherein said core separation recognition unit recognizes that said core has been separated from said piece of work through the analysis of said program and recognizes that said core has been separated from said piece of work through the detection of a predetermined physical quantity that fluctuates in relation with the position of said core relative to said piece of work.

8. The wire electrical discharge machine according to claim 1, wherein said core floating recognition unit recognizes that said core has floated by said predetermined amount through the detection of a predetermined physical quantity that fluctuates in relation with the position relative to said core.

9. The wire electrical discharge machine according to claim 1, wherein said core removal unit is a robot.

10. The wire electrical discharge machine according to claim 1, wherein said core sorting unit is formed of a robot and an image recognition unit.

* * * * *